United States Patent
Shimizu

(10) Patent No.: US 8,376,488 B2
(45) Date of Patent: Feb. 19, 2013

(54) IMAGE RECORDING DEVICE

(75) Inventor: Keigo Shimizu, Kyoto (JP)

(73) Assignee: Dainippon Screen MFG. Co., Ltd. (JP)

( * ) Notice: Subject to any disclaimer, the term of this patent is extended or adjusted under 35 U.S.C. 154(b) by 294 days.

(21) Appl. No.: 12/745,674

(22) PCT Filed: Mar. 13, 2009

(86) PCT No.: PCT/JP2009/001131
§ 371 (c)(1),
(2), (4) Date: Jun. 1, 2010

(87) PCT Pub. No.: WO2009/116255
PCT Pub. Date: Sep. 24, 2009

(65) Prior Publication Data
US 2010/0328376 A1  Dec. 30, 2010

(30) Foreign Application Priority Data
Mar. 17, 2008  (JP) .................................. 2008-067686

(51) Int. Cl.
*B41J 29/38* (2006.01)
*B41J 2/15* (2006.01)
*B41J 2/145* (2006.01)
(52) U.S. Cl. .................... 347/9; 347/5; 347/40; 347/41
(58) Field of Classification Search .................. 347/9
See application file for complete search history.

(56) References Cited

U.S. PATENT DOCUMENTS

| 5,754,198 A * | 5/1998 | Nishikawa ...................... 347/43 |
| 5,946,011 A * | 8/1999 | Kanaya ........................... 347/41 |
| 5,988,790 A | 11/1999 | Koike et al. |
| 6,170,932 B1 * | 1/2001 | Kanaya et al. .................. 347/41 |
| 6,231,161 B1 | 5/2001 | Saruta |
| 6,247,788 B1 * | 6/2001 | Kamei ............................ 347/41 |
| 6,439,685 B1 * | 8/2002 | Kojima .......................... 347/40 |
| 6,530,646 B2 * | 3/2003 | Otsuki ........................... 347/41 |
| 6,540,326 B2 * | 4/2003 | Matsubara et al. ............ 347/41 |
| 2003/0132980 A1 | 7/2003 | Yamazaki et al. |
| 2007/0091135 A1 | 4/2007 | Hosaka et al. |

FOREIGN PATENT DOCUMENTS

| EP | 0 516 366 | 12/1992 |
| JP | 5-124219 | 5/1993 |
| JP | 10-109442 | 4/1998 |
| JP | 2000-185396 | 7/2000 |
| JP | 2003-211644 | 7/2003 |
| JP | 2007-69428 | 3/2007 |
| JP | 2007-118245 | 5/2007 |
| JP | 2007-276353 | 10/2007 |

OTHER PUBLICATIONS

International Search Report with English language translation.

* cited by examiner

*Primary Examiner* — Laura Martin
*Assistant Examiner* — Jeremy Bishop
(74) *Attorney, Agent, or Firm* — Ostrolenk Faber LLP

(57) ABSTRACT

An image recording device for recording an image by an interlace system of scanning a specified region repeatedly with use of an ink-jet head having a configuration of a plurality of nozzle heads arranged in a sub-scanning direction, the nozzle head including multiple ink discharged discharge nozzles arranged in the sub-scanning direction.

3 Claims, 9 Drawing Sheets (a)

IMAGE RECORDING DEVICE

CROSS-REFERENCE TO RELATED APPLICATION

The present application is a 35 U.S.C. §371 national phase conversion of PCT/JP2009/001131 filed Mar. 13, 2009, which claims benefit and priority of Japanese Patent Application No. JP2008-067686 filed Mar. 17, 2008, both incorporated herein in their entirety.

FIELD OF THE INVENTION

This invention relates to an image recording device for recording an image by an interlace system of scanning a specified region repeatedly with use of an ink-jet head having a configuration of a plurality of nozzle heads arranged in a sub-scanning direction, the nozzle head including multiple ink discharge nozzles arranged in the sub-scanning direction.

BACKGROUND ART

In an inkjet printer, it is necessary to improve a movement speed of nozzle heads or increase the number of the nozzles in order to increase a printing speed, namely, the number of pixels to be printed per a unit time. However, since there is a limit in improvement of the movement speed and increase of the number of the nozzles, there is generally adopted a configuration of increasing the number of the nozzles as a whole by arranging and locating a plurality of nozzle heads in a sub-scanning direction (in a column direction of locating the nozzles) (see Patent Literature 1 and Patent Literature 2).

Generally, in an inkjet printer, an interlace system is adopted to obtain a resolution that is higher than the pitch of the nozzles and to cancel the unevenness referred to as a banding due to variations of the nozzles and an error of a transportation pitch.

The interlace system is, for example, a system in which the movement amount of the ink-jet head in the sub-scanning direction every one main scanning is set to 1/N of the interval of the nozzles arranged in column in the sub-scanning direction of the nozzle heads in the ink-jet head and a specified region is overprinted by main-scanning N times and is printed by forming dots with the ink without a gap.

In the printing by this interlace system, whereas the ink is discharged onto a print material having no ink stuck in the first main scanning of the nozzle heads, the ink is discharged onto the print material having an ink partially stuck in the previous main scanning after the second main scanning. Therefore, there was a problem that the unevenness is produced due to such as a stain of the ink on an image to be formed by an influence of the ink previously stuck on the print material.

For addressing such a problem, there has been suggested a dot recording device in which an ink discharge position in each main scanning and a feed amount of the sub-scanning are set such that the positions of ink drops recorded in the main scanning are not adjacent in arbitrary twice of the main scanning (see Patent Literature 3).

[Patent Literature 1] Japanese Unexamined Patent Publication No. 2007-69428A

[Patent Literature 2] Japanese Unexamined Patent Publication No. 2003-211644A

[Patent Literature 3] Japanese Unexamined Patent Publication No. 2000-185396A

DISCLOSURE OF THE INVENTION

Problems to be Solved by the Invention

In an inkjet printer adopting an interlace system, it is assumed that, for example, the movement amount of an ink-jet head in a sub-scanning direction every one main scanning is set to 1/N of the size in the sub-scanning direction of the ink-jet head and a specified region is printed by main-scanning N times and overprinting. At this time, N pieces of the ink drops will be spitted out from the ink-jet head. The interlace system like this is referred to as an interlace system of paths number N. In addition, similarly to this, there is the case where a specified region is printed by overprinting the same N times by shifting the ink discharge positions by 1/N in a main scanning direction.

Here, the specified region is a region decided by a resolution at the time of recording an image, and it is one pixel domain corresponding to a recording resolution. In addition, a belt-shaped prescribed region where ink drops are formed in the sub-scanning direction without a gap by main scanning of multiple times to thereby complete an image is referred to as a swath.

When such an interlace system is adopted, the image is to be recorded for the specified region by different N pieces of nozzles, and therefore the variations of the discharge amount and a discharge direction of the ink from each of the nozzles or the variations of the movement amount in the sub-scanning are leveled, and there is an effect that the banding mentioned above is alleviated.

However, when an image is recorded by the interlace system using the ink-jet head having a configuration of a plurality of nozzle heads arranged in column in the sub-scanning direction, there may likely arise a case where the unevenness in the sub-scanning direction extending in the main scanning direction occurs.

In addition, in order to prevent the dots by arbitrary twice main scanning from being formed in the adjacent positions, there is a method of decreasing the number of the nozzles in the sub-scanning direction of the ink-jet head and controlling the nozzle discharge positions in one time of the main scanning to be depicted to be opened more than a predetermined interval. However, when such a configuration is adopted, the number of the paths in the main scanning direction increases, and there is a problem that the printing speed becomes slow as a result.

In order to solve the problems mentioned above, this invention has been made and has an object to provide an image recording device which is capable of preventing occurrence of unevenness even in the case of recording an image in an interlace system using an ink-jet head having a configuration of a plurality of nozzle heads arranged in column in the sub-scanning direction and allowing compatibility between high productivity and suppression of unevenness without increasing the number of paths of the interlace.

Means Adapted to Solve the Problems

A first aspect of the present invention is an image recording device for recording an image by an interlace system of paths number N in which an image is recorded by repeatedly scanning a specified region N times using an ink-jet head having a configuration of M pieces of nozzle heads arranged in column in a sub-scanning direction, each of the nozzle heads having multiple ink discharge nozzles arranged in column in the sub-scanning direction, assuming that M and N are integers of 2 or more, wherein the image recording device includes: storage means adapted to store plural paths number N as satisfying N=i×M when i is an integer of 1 or more; selecting means adapted to select the number N of paths in accordance with a required resolution; and control means adapted to execute the interlace scanning based on the selected number N of paths by the ink-jet head.

A second aspect of the present invention is the invention as defined in the first aspect of the present invention wherein the ink-jet head is moved in the sub-scanning direction by a distance corresponding to 1/N of a size of the ink-jet head in the sub-scanning direction every one time main scanning to thereby record the image so that N drops of the ink are ejected at positions different in the sub-scanning direction in the specified region.

A third aspect of the present invention is the invention as defined in the first aspect of the present invention wherein when a and b are integers of 2 or more and a×b=N, the image for the specified region is recorded specified times given by multiplying a recording resolution by a in the sub-scanning direction and recorded specified times given by multiplying a recording resolution by b in the main scanning direction whereby the image for the specified region is recorded specified times specified by multiplying a recording resolution by N, and the ink-jet head is moved in the sub-scanning direction by a distance corresponding to 1/N of a size of the ink-jet head in the sub-scanning direction every one time main scanning to thereby record the image so that N drops of the ink are ejected at positions different in the sub-scanning direction and the main scanning direction in the specified region.

A fourth aspect of the present invention is an image recording device for recording an image by an interlace system of paths number N in which an image is recorded by repeatedly scanning N times using an ink-jet head having multiple ink discharge nozzles arranged in column in a sub-scanning direction, wherein, assuming that a is an integer of 2 or more and b is an integer of 1 or an integer mutually prime to a, and when a region defined by b×a including b pieces of pixels in the main scanning direction and a pieces of pixels in the sub-scanning direction is recorded a×b=N times, and assuming that an interval of the nozzles is W, a movement distance of the ink-jet head in the sub-scanning direction every one time main scanning is set to W×(j +c/a), and a distance between a recording position by a n-th path and a recording position by a (n+1)th path in the main scanning direction corresponds to d pieces of pixels, wherein j is an integer of 1 or more, c is 1 or more and is less than a, and further, c is 1 or an integer mutually prime to a, and d is 1 or an integer mutually prime to b.

A fifth aspect of the present invention is the invention as defined in the fourth aspect of the present invention wherein the a is an integer larger than the b.

A sixth aspect of the present invention is the invention as defined in the fifth aspect of the present invention wherein the a is 8 and the b is 3.

Effect of the Invention

According to the inventions as defined in the first to sixth aspects of the present invention, even in the case where an image is recorded in the interlace system using an ink-jet head having a configuration of a plurality of nozzle heads arranged in column in a sub-scanning direction, it becomes possible to prevent occurrence of the unevenness.

According to the invention as defined in the third aspect of the present invention, even in the case of using an interlace function in main scanning and sub-scanning directions, it becomes possible to prevent occurrence of the unevenness.

According to the inventions as defined in the fourth to sixth aspects of the present invention, it becomes possible to prevent occurrence of the unevenness appearing due to the ink drops formed in adjacent positions in arbitrary twice of main scanning, without loss of a recording speed.

According to the inventions as defined in the fifth and sixth aspects of the present invention, it becomes possible to reduce the unevenness of the image quality in the sub-scanning direction.

BRIEF DESCRIPTION OF THE DRAWINGS

FIG. 8 is an explanatory diagram showing a relationship between a region and a depicted position in each of the main scanning.

FIG. 9 is an explanatory diagram showing a relationship between a region and a depicted position in each of the main scanning.

DESCRIPTION OF REFERENCE NUMERALS

Figure 1:
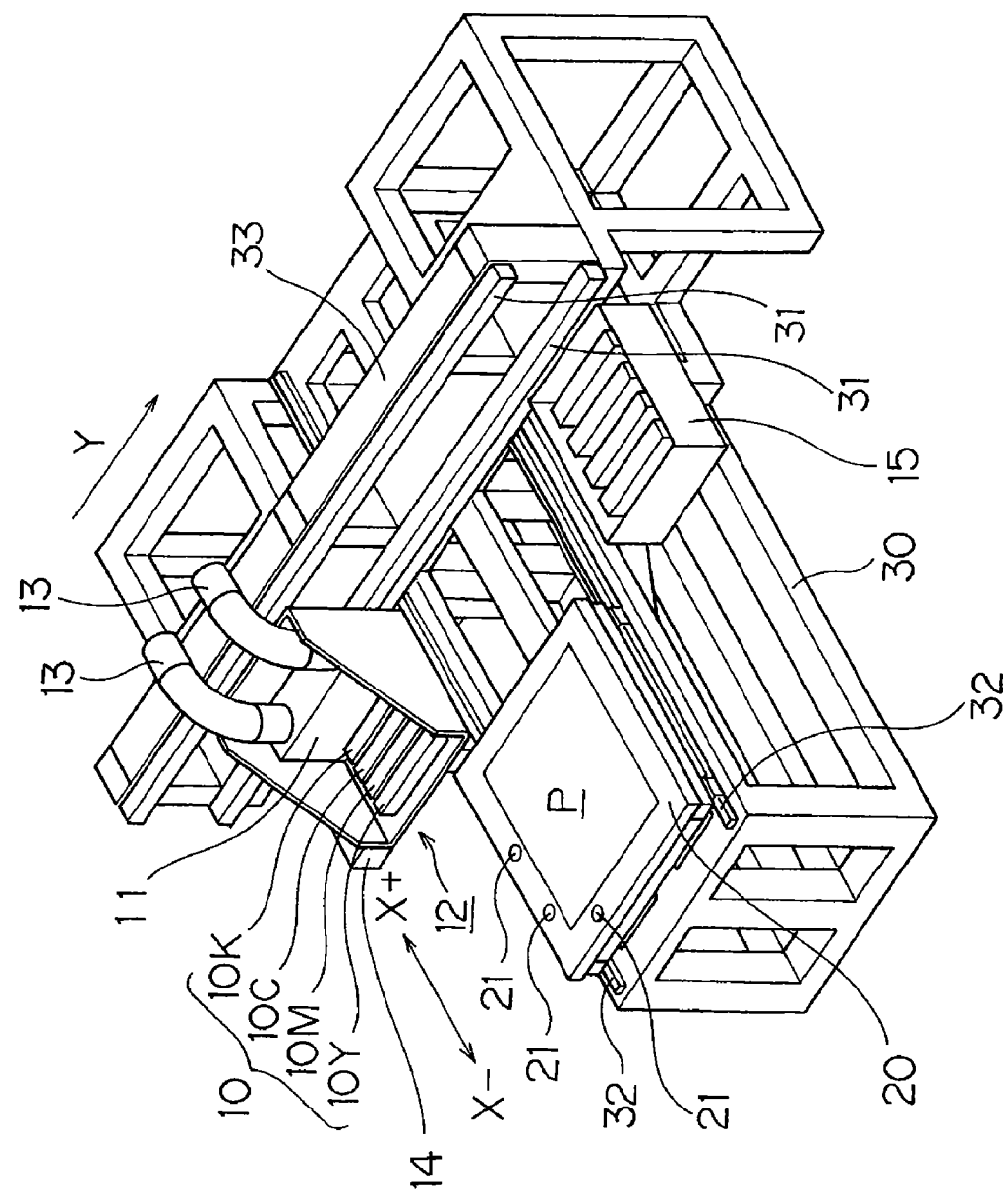
FIG. 1 is a perspective view of an image recording device adopting this invention.

10 Ink-jet head
11 Ultraviolet irradiation mechanism
12 Recording head
13 Exhaust duct
14 CCD camera
15 Cleaning unit
20 Table
21 Positioning pin
30 Main body frame
32 Main scanning guide
33 Countershaft frame
41 Control unit
42 Storage unit
43 Input unit
44 Display unit
P Recording medium

BEST MODE FOR CARRYING OUT THE INVENTION

Embodiments of this invention are explained below referring to the drawings. FIG. 1 is a perspective view of an image recording device according to this invention.

This image recording device includes: a main body frame 30; a table 20 including positioning pins 21 and having a recording medium P disposed thereon; a pair of main scanning guides 32 disposed on the main body frame 30 for reciprocating movement in X+ and X− directions of the table 20; a countershaft frame 33; a recording head 12 which includes an ink-jet head 10 provided with multi ink discharge nozzles, an ultraviolet irradiation mechanism 11 and a CCD camera 14; a pair of countershaft guides 31 disposed on the countershaft 33 for moving the recording head 12 in Y direction; and a cleaning unit 15 for the ink-jet head 10.

The ink-jet head 10 includes a yellow ink-jet head 10Y for discharging yellow ink, a magenta ink-jet head 10M for discharging magenta ink, a cyan ink-jet head 10C for discharging cyan ink and a black ink-jet head 10K for discharging black ink. In addition, the ultraviolet irradiation mechanism 11 is provided with a pair of exhaust ducts 13 that constitute a part of a cooling mechanism thereof.

When an image is recorded by this image recording device, the inks are ejected from the ink-jet heads 10Y, 10M, 10C and 10K while moving the table 20 with the recording medium P disposed thereon in the X+ direction. The inks ejected from the ink jet heads 10Y, 10M, 10C and 10K and applied onto the recording medium P are fixed by receiving the irradiation of ultraviolet rays from the ultraviolet irradiation mechanism 11. When the table 20 is moved to a stroke end in the X+ direction, the table 20 is moved in the X− direction. Also, the recording head 12 is moved by a minute distance in the Y direction.

In this way, in this image record device, it is constructed that the recording medium P together with the table 20 is reciprocated in the main scanning direction (X direction in FIG. 1) and the recording head 12 is intermittently moved in the sub-scanning direction (Y direction in FIG. 1) so that an image is recorded on the recording medium P.

Figure 2:
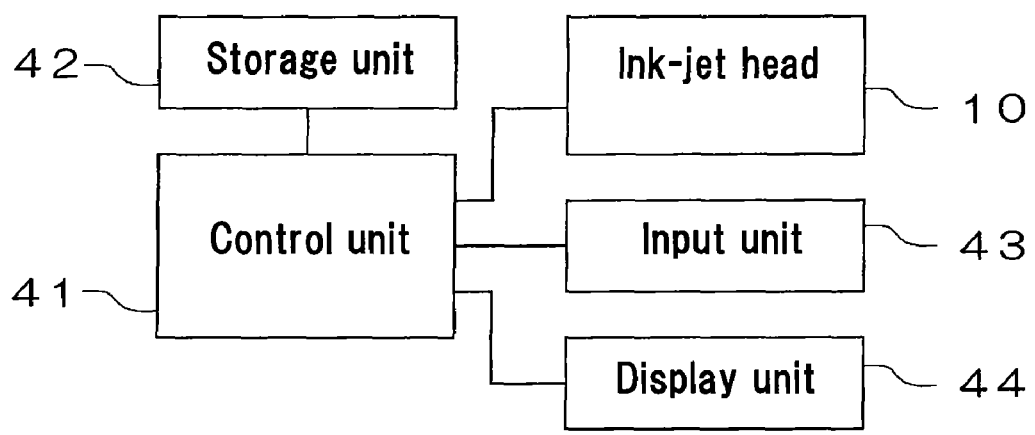
FIG. 2 is a block diagram showing an essential electrical configuration of an image recording device according to this invention.

FIG. 2 is a block diagram showing a main electric configuration of the image recording device according to this invention.

This image recording device includes a control unit 41 that includes a ROM storing an operational program required for control of the device, a RAM for temporarily storing data and the like at the time of controlling and a CPU for executing a logical operation. This control unit 41 is connected to a storage unit 42 storing a table showing a relationship between a resolution and a number of paths to be described later. Also, this control unit 41 is connected to the ink-jet head 10 mentioned above, to an input/output unit 43 for inputting data containing selection of the number N of paths to be described later, and to a display unit 44 for displaying necessary data and the like.

Figure 3:
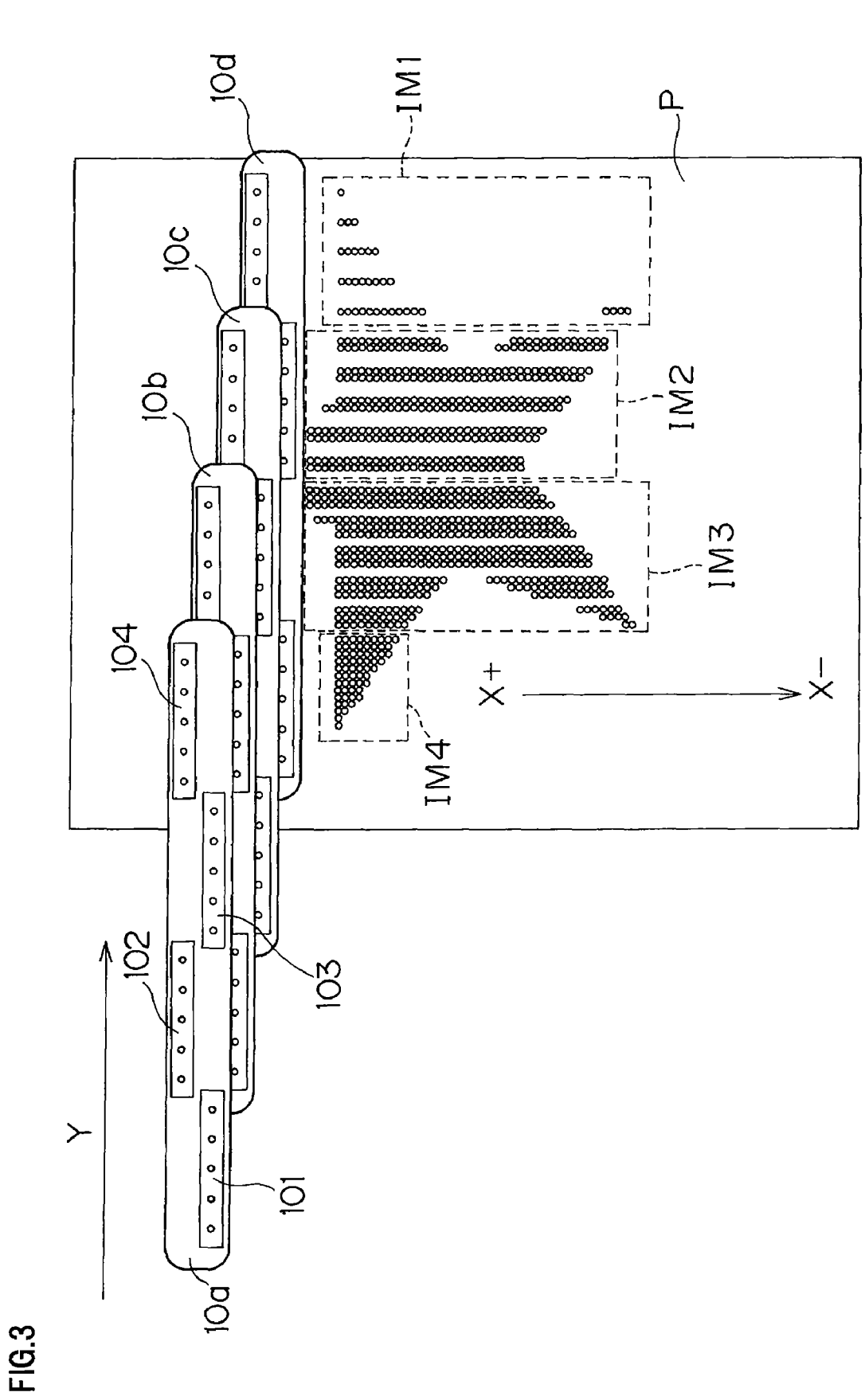
FIG. 3 is an explanatory diagram showing an appearance of recording an image in an interlace system.

FIG. 3 is an explanatory diagram showing a state of recording an image in an interlace system by the image recording device as described above. The ink-jet head 10 shown in this FIG. 3 illustrates one of the ink-jet heads 10Y, 10M, 10C and 10K and the others are omitted. It is noted that each of the ink-jet heads 10Y, 10M, 10C, 10K has the same configuration.

Each ink jet head 10 has a configuration in which four nozzle heads 101, 102, 103 and 104 each having five nozzles are staggered in arrangement in the sub-scanning direction. Every time the main scanning by the ink-jet head 10 is completed, the ink-jet head 10 is intermittently moved in the sub-scanning direction Y to sequentially form a two-dimensional image on the image recording material P. Marks 10a, 10b, 10c and 10d in FIG. 3 denote sub-scanning positions of the ink-jet head 10 at a starting time of the main scanning. As shown in FIG. 3, the ink-jet head 10 is moved by a size of the ink-jet head 10 in the sub-scanning direction, namely, sequentially moved in the sub-scanning direction by a length quarter of the maximum recording size in the sub-scanning direction by the four nozzle heads 101, 102, 103 and 104. At this time, four ink drops are spitted out from the ink-jet head 10 to the specified region.

It is noted that, although the main scanning positions of the ink-jet head 10 is actually identical at the time of starting each main scanning, the positions are shifted in the main scanning direction in the illustration to be easy to distinguish.

A mark IM1 shows an image portion that was subjected to the main scanning only once. In other words, it is an image portion recorded only by the nozzle head 104 on the ink-jet head 10d located in the sub-scanning position 10d.

A mark IM2 shows an image portion that was subjected to the main scanning twice. In other words, it is an image portion recorded by the nozzle head 104 on the ink-jet head 10 located in the sub-scanning position 10c and by the nozzle head 103 on the ink-jet head 10d located in the sub-scanning position 10d. When an image recording is performed by the nozzle head 103 on the sub-scanning position 10d, the main scanning is performed so that the nozzle head 104 on the sub-scanning position 10c is adjacent to a scanning line which recorded the image.

A mark IM3 shows an image portion that was subjected to the main scanning three times. In other words, it is an image portion recorded by the nozzle head 104 on the ink-jet head 10 located in the sub-scanning position 10b, by the nozzle head 103 on the ink-jet head 10 located in the sub-scanning position 10c, and by the nozzle head 102 on the ink-jet head 10 located in the sub-scanning position 10d. When image recording is performed by the nozzle head 103 on the ink-jet head 10 in the sub-scanning position 10d, the main scanning is performed so that the nozzle head 104 on the ink-jet head 10 in the sub-scanning position 10c is adjacent to the scanning line which recorded the image. When image recording is performed by the nozzle head 102 on the sub-scanning position 10c, the main scanning is performed so that the nozzle head 104 on the ink-jet head 10 in the sub-scanning position 10b is adjacent to the scanning line which recorded the image.

A mark IM4 shows an image portion of an image that was completed by performing the main scanning four times. In other words, as for this image portion IM4, the main scanning from the ink-jet heads 10 located in the sub-scanning positions 10a, 10b, 10c and 10d is performed four times in total.

As apparent from the comparison among four image portions IM1, IM2, IM3 and IM4, the interspaces between the main scanning lines recorded by the former main scanning are buried with the latter main scanning, namely, so-called an interlace scanning is performed in the present image recording device.

Figure 4:
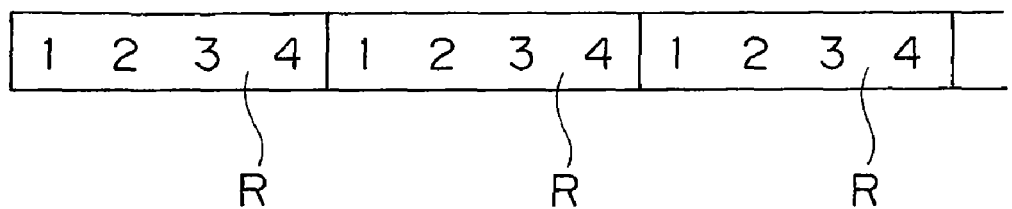
FIG. 4 is an explanatory diagram schematically showing an appearance of ejecting ink drops onto a specified region R in the interlace system.
Figure 4:
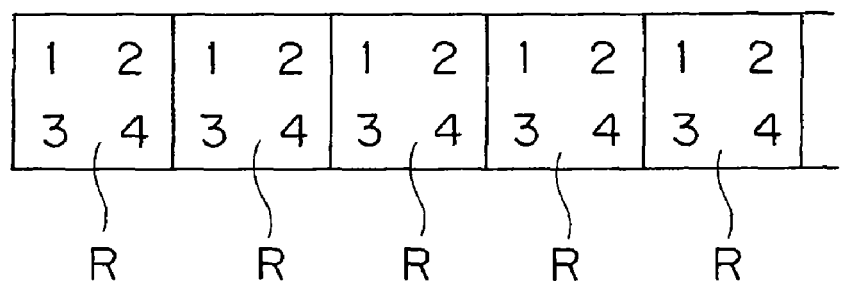

FIG. 4 is an explanatory diagram schematically showing an appearance of ink drops being discharged to a specified region R by such an interlace system.

In other words, as shown in FIG. 4(a), every one main scanning, the image is recorded by moving the ink-jet head 10 in the sub-scanning direction by a distance quarter of the size in the sub-scanning direction of the ink-jet head 10 whereby four ink drops located on different positions in the sub-scanning direction are discharged to the specified region R. That is, in the present embodiment, the image is recorded by discharging the ink drops to the specified region R specified times that are four times of the recording resolution possessed by the ink-jet head 10.

In FIG. 4, numeral 1 denotes a position of an ink drop discharged at a time of first main scanning in the four times of cycles, numeral 2 denotes a position of an ink drop discharged at a time of second main scanning in the four times of cycles, numeral 3 denotes a position of an ink drop discharged at a time of third main scanning in the four times of cycles, and numeral 4 denotes a position of an ink drop discharged at a time of fourth main scanning of the four times of cycles.

In the example shown in FIG. 4(a), although the subsequent scanning is executed in the sub-scanning position that is adjacent to the sub-scanning position of a former path, it is also possible to interpolate in the order of {1,3,2,4} and so forth.

By adopting such an interlace system, it becomes possible to obtain a print resolution higher than the pitch of the nozzles and cancel unevenness referred to as a banding due to the variations of the nozzles and an error of a carrying pitch.

In FIG. 4(a), the specified region R is repeatedly scanned four times by changing the discharge positions of the ink drops for the specified region R in the sub-scanning direction. In contrast to this, it is also possible to repeatedly scan the specified region R multiple times by changing the discharge positions not only in the sub-scanning direction but also in the main scanning direction in the specified region R.

In other words, as shown in FIG. 4(b), the movement amount of the ink-jet head 10 in the sub-scanning direction every one main scanning is set to ¼ of the size of the ink-jet head 10 in the sub-scanning direction and the discharge positions of the ink drops for the specified region R are shifted in the main scanning direction and the sub-scanning direction so that the specified region R may be overprinted by the main scanning four times.

By the way, in the embodiment mentioned above, the image is recorded in the interlace system of paths number 4 using the ink-jet head 10 having a configuration of the four nozzle heads 101, 102, 103 and 104 arranged in column in the sub-scanning direction, but it was found by experiments and the like by the present inventors that there was the case where the unevenness in the sub-scanning direction extending in the main scanning direction may occur when the number of paths is set to 3 at this time.

In other words, for example, when the image is recorded in the interlace system of paths number 3 using the ink-jet head 10 having a configuration of four nozzle heads 101, 102, 103 and 104 arranged in column in the sub-scanning direction, each part of the image is to be recorded using three of the four nozzle heads 101, 102, 103 and 104. At this time, if there are variations in discharge amount and discharge direction of the ink or installation precision in the individual nozzle heads 101, 102, 103 and 104, there will occur unevenness every each portion of the image according to the combination of the heads used for the recording of the portions.

On this account, in the image recording device according to this invention, when assuming that the number of the nozzle heads arranged in column in the sub-scanning direction is M and the number of paths of the interlace is N, the number N is so defined as to satisfy $N=i \times M$ (wherein M, N, and i are integers of 1 or more). For example, in the case of using the ink-jet head 10 having a configuration of four nozzle heads 101, 102, 103 and 104 arranged in column in the sub-scanning direction as described above, the numbers of paths of the interlace are 4, 8, 12, 16 . . . . And it is decided according to the resolution required for recording the image as to which of the paths numbers is chosen.

Figure 5:
FIG. 5 is a schematic diagram showing recorded results of recording an image with sequentially changing the number N of paths using an ink-jet head having a configuration of four nozzle heads arranged in column in a sub-scanning direction.
Figure 5:
Figure 5:
Figure 5:
Figure 5:

FIG. 5 is a model diagram showing a recorded result obtained by recording an image while sequentially changing the number N of paths in the case where there is little output of the ink from one of the four nozzle heads 101 to 104 when using the ink-jet head 10 having a configuration of the four nozzle heads 101, 102, 103 and 104 arranged in column in the sub-scanning direction as mentioned above.

Among these figures, FIGS. 5(a), (b) and (e) show the case where the discharge position of the ink drop for the specified region R is changed in the sub-scanning direction as shown in FIG. 4(a), and FIGS. 5(c) and (d) show the case where the discharge position of the ink drop for the specified region R is changed in the main scanning direction and the sub-scanning direction as shown in FIG. 4(b). And the case of paths number N being 4 is shown in FIG. 5(a), the case of paths number N being 3 is shown in FIG. 5(b), the case of paths number N being 4 is shown in FIG. 5(c), the case of paths number N being 6 is shown in FIG. 5(d), and the case of paths number N being 8 is shown in FIG. 5(e), respectively.

As apparent from this figure, in FIGS. 5(a), (c) and (e) satisfying the expression $N=i \times M$, the whole image becomes uniform, and there appears no unevenness. In contrast, in FIGS. 5(b) and (d) that do not satisfy the expression $N=i \times M$, there occurs an unevenness that causes an image to be non-uniform.

On this account, in the image recording device according to the present invention, a relationship between the number N of paths and the number M of the nozzle heads as satisfying the expression $N=i \times M$ is previously stored in the storage unit 42 shown in FIG. 2. In this case, plural N will be stored when M is fixed. And approximate resolution at the time of recording the image when using the number N of the paths is also stored as well. For example, considered is a case that the ink-jet head 10 has four nozzle heads (M=4) and the recording resolution in the sub-scanning direction peculiar to the ink-jet head 10 is 250 dpi. In this case, the number N of the paths satisfying the expression $N=i \times 4$ and the resolution corresponding to each of the paths number N are previously stored.

That is, values {4, 8, 12, . . . } can be taken as N.

When the value of N is 2 or more, a plurality of combinations of the paths number in the main scanning direction and the paths number in the sub-scanning direction can be taken, and therefore every possible recording resolutions in each of the combinations are previously stored.

For example, when N=4, each one case of 1:4, 2:2, 4:1 can be taken as the combination with the number of the paths in the main scanning direction.

Therefore, when N=4, an image can be recorded, with a recording resolution of 1000 dpi in the sub-scanning direction in case of recording with one path in the main scanning direction, with a recording resolution of 500 dpi in the sub-scanning direction in case of recording with two paths in the main scanning direction, and with a recording resolution of 250 dpi in the sub-scanning direction in case of recording with three paths in the main scanning direction. Among these resolutions, one or more necessary combinations are previously stored in correspondence with N=4.

It is similar when N=8. That is, the combinations of the paths number in the main scanning direction and the paths number in the sub-scanning direction and the recording resolutions in the main scanning direction and in the sub-scanning direction in each of the combinations are previously stored in correspondence with N=8.

And N satisfying the expression=$i \times M$ and the resolution at this time are displayed in the display unit 44 shown in FIG. 2 when an image is recorded. For example, N=4 and a plurality of recording resolutions (recording resolution=1000 dpi, 500 dpi, 250 dpi in the sub-scanning direction) possible in this case are displayed in the display unit 44. And an operator chooses the paths number N which can realize an image recording with a desired recording resolution among a plurality of N displayed in the display unit 44 and inputs to the control unit 41 from the input unit 43. In addition, the paths number in the main scanning direction and the paths number in the sub-scanning direction are designated. Further, the recording resolution in the main scanning direction is designated.

In the above description, a plurality of recording resolutions are associated with a single paths number. For example, three recording resolutions (1000 dpi, 500 dpi, 250 dpi) are associated with the paths number 4. However, it is possible to limit the recording resolution associated with one paths number to only one.

In this case, when the operator selects a desired number of paths among a plurality of numbers N of paths displayed in the display unit 44, the recording resolution associated with the selected number of paths will be univocally decided. Or, when the operator selects a desired recording resolution among a plurality of record resolutions displayed in the display unit 44, the number of paths associated with the selected recording resolution will be univocally decided.

After the control unit 41 processes the image data to record the image with the specified number of paths and the specified recording resolution, the control unit 41 executes the print in the interlace system by the number N of paths for printing the specified region by overprinting the same in the main scanning N times, by using the ink-jet head 10 having a configuration of four nozzle heads 101, 102, 103 and 104 arranged in column in the sub-scanning direction.

In the embodiment mentioned above, FIG. 5(*c*) indicates the case where the image is recorded a number of times that is twice the recording resolution in the sub-scanning direction and is recorded a number of times that is twice the recording resolution in the main scanning direction whereby the image is recorded by discharging the ink drops for the specified region a number of times that is four times the recording resolution.

Next, another embodiment of this invention is described referring to FIGS. 6 to 9. Note that, in FIGS. 6 to 9, a lengthwise (top and bottom) direction on a sheet face is the sub-scanning direction and a widthwise (right and left) direction on the sheet face is the main scanning direction.

In the present embodiment, the print control is executed in consideration of the drawing order at each pixel position in a region of a×b in a unit of one recording resolution (pixel) of the sub-scanning and the main scanning. The region of a×b here is a concept similar to the specified region mentioned above.

Figure 6:
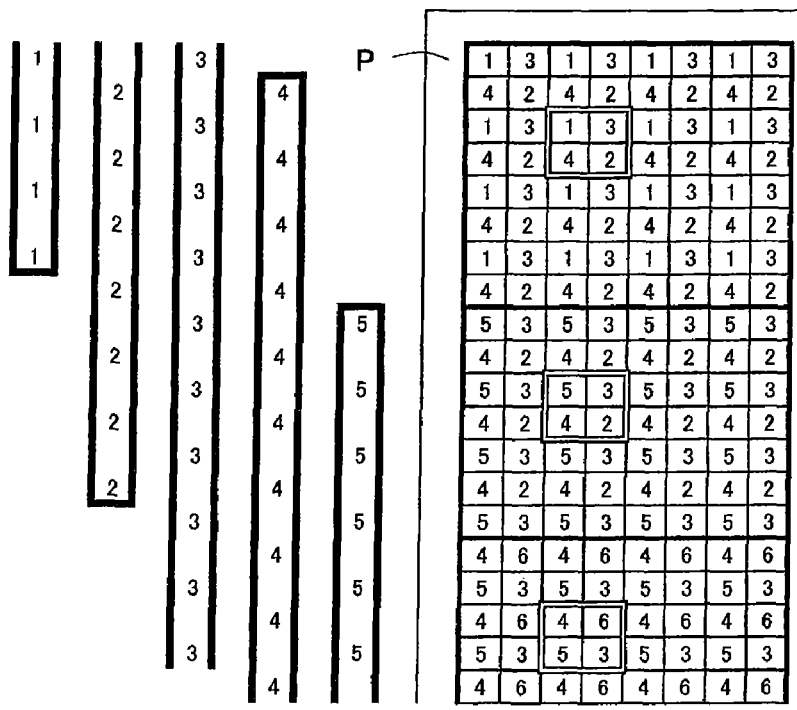
FIG. 6 is an explanatory diagram showing a relationship between positions of the nozzle heads and the depicted positions in each of every main scanning.
Figure 6:
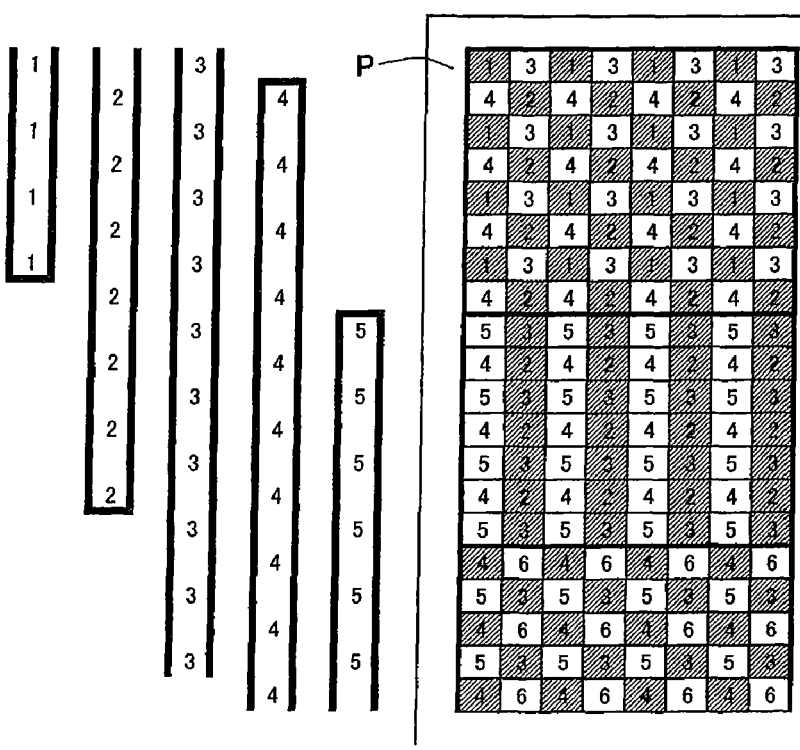

FIG. 6 is an explanatory drawing that shows the relation between the positions of the nozzle heads and the depicted positions thereof every main scanning. In FIG. 6, there is shown an example in the case where a and b are integers which are not mutually prime and are not applicable to the condition of this invention. That is, a case is shown when considering the region of a=2 and b=2 enclosed by a double line at the drawing position in the image at the right of FIG. 6(*a*).

Numerals in FIGS. 6(*a*) and 6(*b*) show the frequency of each main scanning, that is, each path for the first to fifth times. And, an appearance of the movement in the sub-scanning direction of one nozzle head at every main scanning is shown by black frames at left sides of FIGS. 6(*a*) and 6(*b*). The positions of the numerals in the black frames correspond to the positions of the nozzles arranged in column in the sub-scanning direction in the nozzle heads. Moreover, at right sides of FIGS. 6(*a*) and 6(*b*), an image actually formed on the recording medium P is shown, while showing a number of times of the main scanning in which each of the pixels in the image is formed by the nozzle drops, corresponding to the positions of the nozzles shown at the left in the figures.

In FIG. 6, a region of 2×2 is depicted by four times of the main scanning. Moreover, each swath that is a region depicted in the sub-scanning direction without a space is also formed by four times of the main scanning. As shown in FIG. 6(*a*), the swaths 1, 2 and 3 are depicted by moving the nozzle head in the sub-scanning direction so that the swath 1 is formed with first to fourth paths, the swath 2 is formed with second to fifth paths and the swath 3 is formed with third to sixth paths.

Here, when paying attention to the region of a×b where a=2 and b=2 enclosed with a double line in a depicted position on the image in FIG. 6(*a*), it is understood that the depicting order is different between the swath 1 and the swath 2.

In FIG. 6(*b*), in order to clarify the difference in depiction order every swath and make the position on the print material P depicted by continuous arbitrary twice of main scanning comprehensible, hatching is fixed to a position in which it is depicted by the first main scanning in each swath and a position to be depicted by the next main scanning. That is, hatching is provided at a position which is depicted with the first and second paths in the swath 1, at a position which is depicted with the second and third paths in the swath 2, and at a position which is depicted with the third and fourth paths in the swath 3.

As shown in FIG. 6(*b*), in the swaths 1 and 3, the position depicted by the first main scanning and the position depicted in the next main scanning appear at equal intervals in both of the main scanning direction and the sub-scanning direction in each of the swaths. In contrast to this, in the swath 2, the position depicted by the first main scanning and the position depicted by the next main scanning become the same position in the sub-scanning direction.

Thus, when the positions of the ink drops discharged in arbitrary twice of the main scanning are different in arrangement, a difference of so-called an interference in every pixel such as an expansion and a blot condition, etc. of each ink drop becomes a difference of an image quality in every swath to appear. That is, since differences in print texture, ink density or color difference, etc. occur in each swath, these differences appear as a stripe-shaped unevenness of a print as a whole image.

Figure 7:
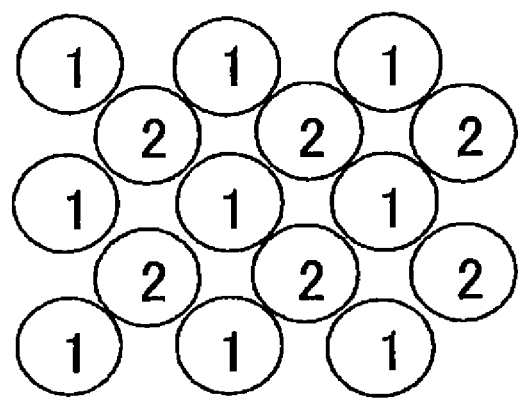
FIG. 7 is an explanatory diagram showing a state of ink drops in every swath.
Figure 7:
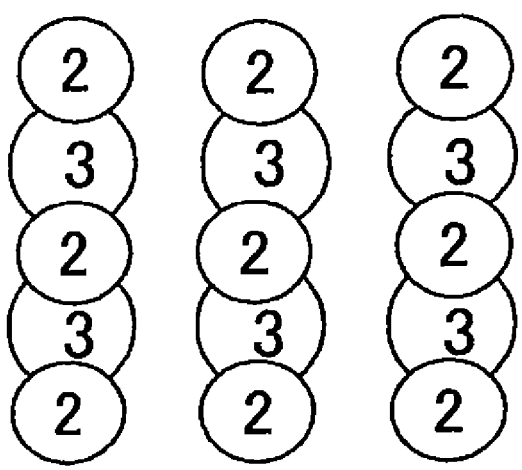

One example of the difference in image quality due to the difference of the interference in each pixel is explained referring to FIG. 7. FIG. 7 is an explanatory drawing showing a state of the ink drops in each swath. FIG. 7(*a*) typically shows a state of the ink drops in the swath 1 on the recording medium P in FIG. 6(*b*), and FIG. 7(*b*) typically shows a state of the ink drops in the swath 2 on the recording medium P in FIG. 6(*b*), respectively.

As shown in FIG. 7(*a*), it is understood that each of the nozzle drops formed by the path 1 that is the first main scanning and the nozzle drops formed by the path 2 that is the subsequent main scanning in the swath 1 keeps a constant expansion without mutually interfering.

However, in the swath 2 as shown in FIG. 7(*b*), it is understood that the nozzle drops previously formed by the path 2 that is the first main scanning in the swath 2 interfere with the nozzle drops formed by the path 3 that is the subsequent main scanning. That is, the nozzle drops formed by the path 3 are rejected by nozzle drops previously formed by the path 2 and are extended to a region where a nozzle drop has not been formed on the recording medium P yet.

Thus, since the depicting order in the region of a×b is different, when depiction having different extension of the ink drops in each swath is performed, the uniformity of the printing as the entire image will be ruined.

Figure 8:
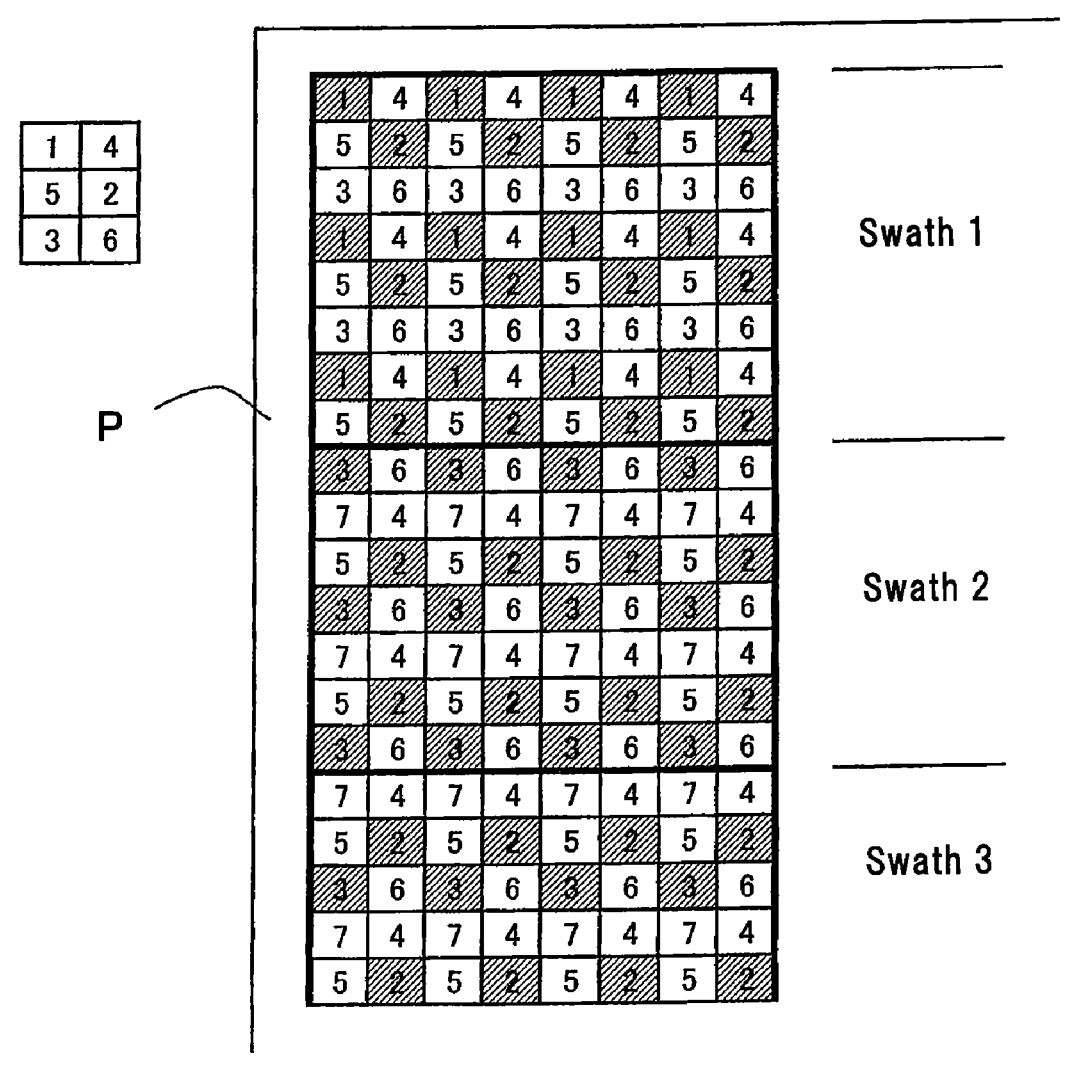

FIG. 8 is a diagram showing a relation between a region and a depicting position in each main scanning. In FIG. 8, there is shown a case where a region of a=3 and b=2 is depicted by N times of main scanning, where a is an integer of 2 or more and b is an integer of 1 or an integer mutually prime with respect to a.

And, a depicting order in a case of depicting the region of 3×2 by main scanning six times is shown at the left of FIG. 8. Moreover, the depicting order in the region of 3×2 is shown in association with the pixel positions on the image at the right of FIG. 8. Moreover, at the right of FIG. 8, hatching is added to the depicting position in the first main scanning and to the depicting position in the next main scanning in each swath.

In this case, as shown in FIG. 8, the depicting position in the first main scanning in each swath and the depicting position in the next main scanning appear with a regular interval and contiguity relationship in every swath.

A depicting condition for keeping such a relative depicting order constant is on the premise that the region of a×b is depicted a×b=N times while a relative movement distance c in the sub-scanning direction of the depicting position in n-th and (n+1)th paths and a relative movement distance d in the main scanning direction are kept constant, respectively. And, when the movement distance in the sub-scanning direction of an ink-jet head provided with a plurality of nozzle heads at each main scanning is obtained from the following relational expression, it is possible to achieve it.

$$W \times (j+c/a) \quad \text{(Expression 1)}$$

In this relational expression, W is an interval of the nozzles in the nozzle head. Moreover, j is an integer of one or more representing the number of the nozzles that corresponds to the movement amount in the sub-scanning direction. c is 1 or more and is less than a, and further, c is 1 or an integer mutually prime to a. And, d is 1 or an integer mutually prime to b.

Note that, though the value of j and c is not especially specified, it is necessary to decide j and c every main scanning in the image recording of the interlace system so that the value of the movement amount (j+c) in the main scanning of consecutive N times corresponds to "nozzle interval×total nozzle number" (i.e., a width in the sub-scanning direction of the nozzle head having the nozzles arranged in column). However, j in each of the main scanning may be a different value, and it is not necessary to keep the movement amount at each main scanning constant.

In addition, the values of a and b only need to be mutually prime integers, and it is not especially defined which is larger or smaller each other. However, in the actual printing, as to variations of the nozzles and an error in feeding amount of the recording material P and so forth, there are more causes of the unevenness in image quality in the sub-scanning. Therefore, it is preferable for reducing the unevenness that the value of a in the sub-scanning direction is enlarged and that the ink drops discharged in each main scanning are partially overlapped in the sub-scanning direction.

Figure 9:
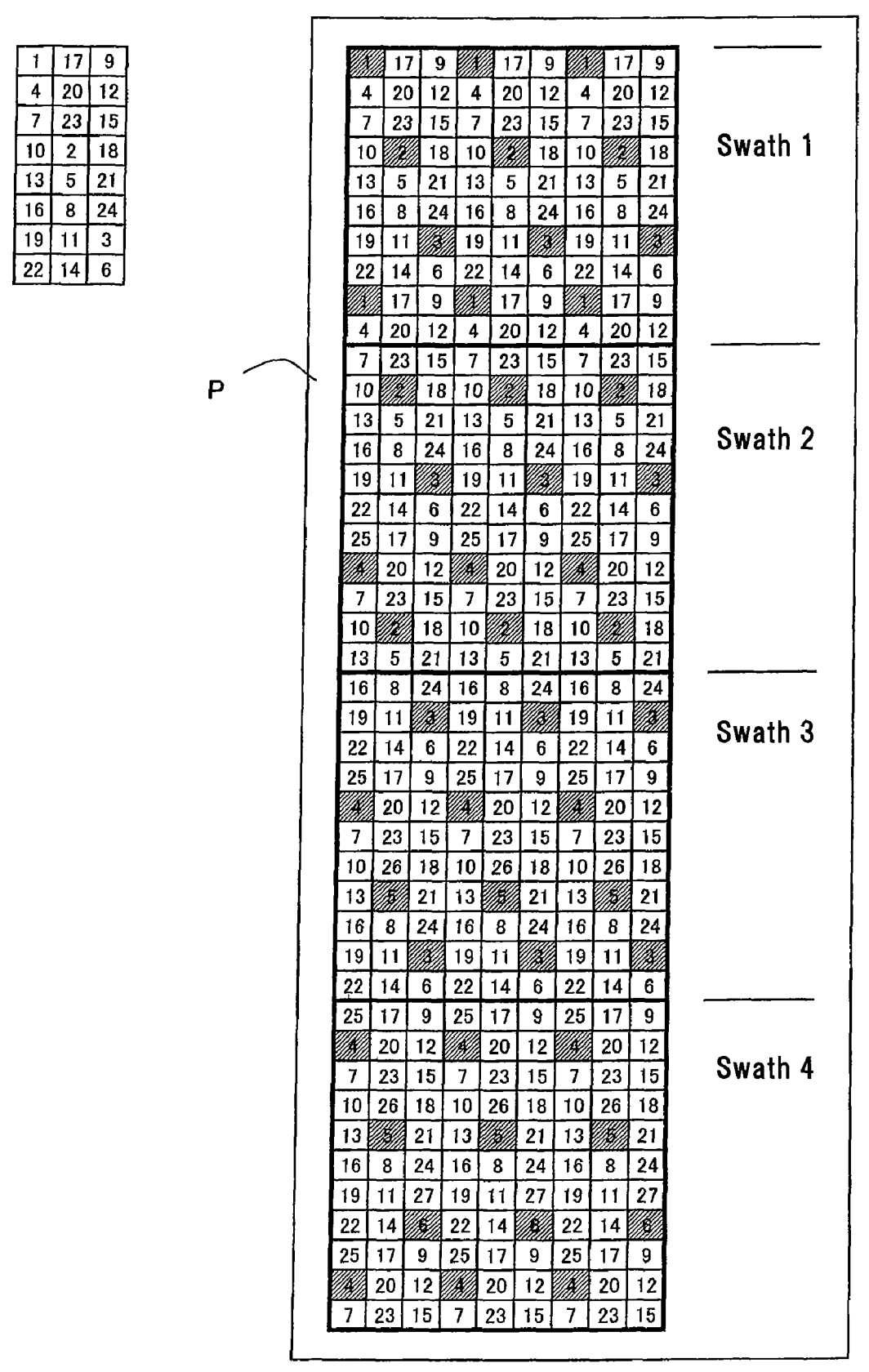

FIG. 9 is an explanatory diagram showing a region and a depicting position in each main scanning. FIG. 9 shows a condition of satisfying a case of depicting in the interlace system having paths number N=24 (number of integral multiples of the nozzle heads M) with an ink-jet head having a configuration of four nozzle heads arranged in column in the sub-scanning direction. Here, a=8, b=3, c=3, d=1, and the movement distance in the sub-scanning direction is obtained by the expression (1) mentioned above.

A depicting order of depicting a region of 8×3 by main scanning 24 times is shown at the left of FIG. 9. Moreover, in the depicting position on the image shown at the right of FIG. 9, hatching is added to the depicting positions depicted by arbitrary continuous three times of main scanning in each swath.

As shown in FIG. 9, the depicting positions by consecutive main scanning three times appear to have a regular depicting interval and a contiguity relationship in any of the swaths. Therefore, an image quality different in each swath can be prevented from appearing, and the unevenness of the entire image can be prevented from occurring.

What is claimed is:

1. An image recording device for recording an image by an interlace system of paths number N in which an image is recorded by repeatedly scanning N times using an ink-jet head having multiple ink discharge nozzles arranged in column in a sub-scanning direction, wherein, assuming that a is an integer of 3 or more and b is an integer of 2 or more, or an integer mutually prime to a, and when a region defined by b×a including b pieces of pixels in a main scanning direction and a pieces of pixels in the sub-scanning direction is recorded a×b=N times, and assuming that an interval of the nozzles is W, a movement distance of the ink-jet head in the sub-scanning direction every one time main scanning is set to W×(j+c/a), and wherein a distance between a recording position by a n-th path and a recording position by a (n+1)th path in the main scanning direction corresponds to d pieces of pixels, where j is an integer of 1 or more, c is an integer of 1 or more and smaller than a and further is an integer of 1 or mutually prime to a, and d is an integer of 1 or mutually prime to b.

2. The image recording device according to claim 1, wherein said a is an integer larger than said b.

3. The image recording device according to claim 2 wherein said a is 8 and said b is 3.

* * * * *